May 26, 1964   M. BROWN ETAL   3,134,295
PICTORIAL DISPLAY NAVIGATION EQUIPMENT
Filed March 15, 1960   4 Sheets-Sheet 3
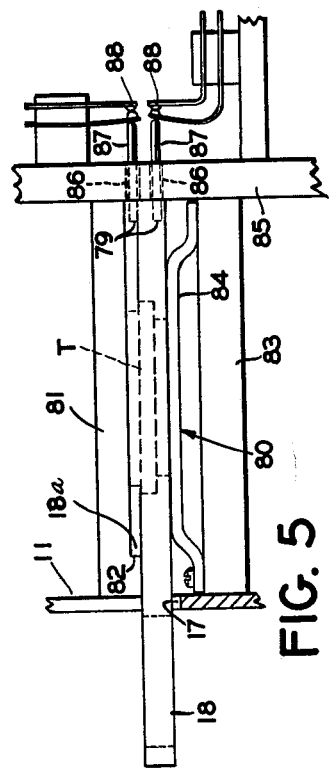
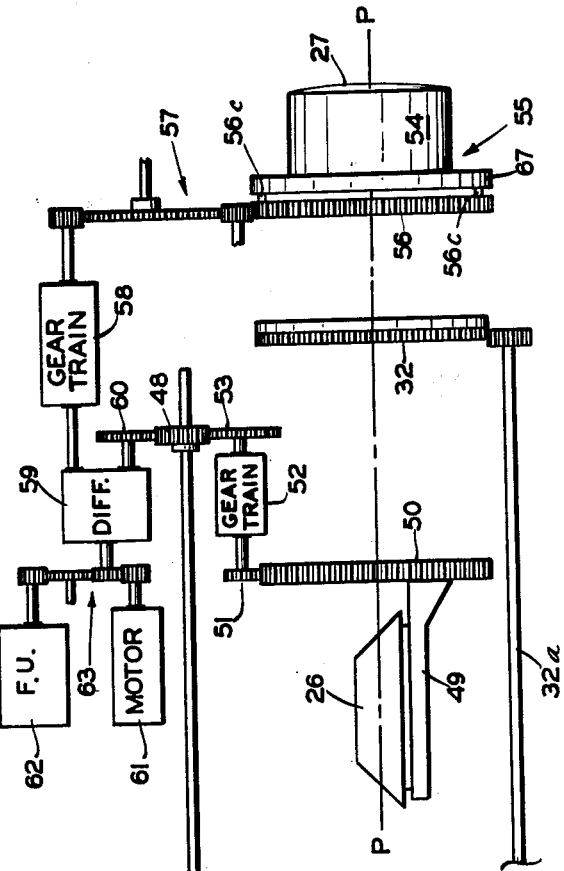
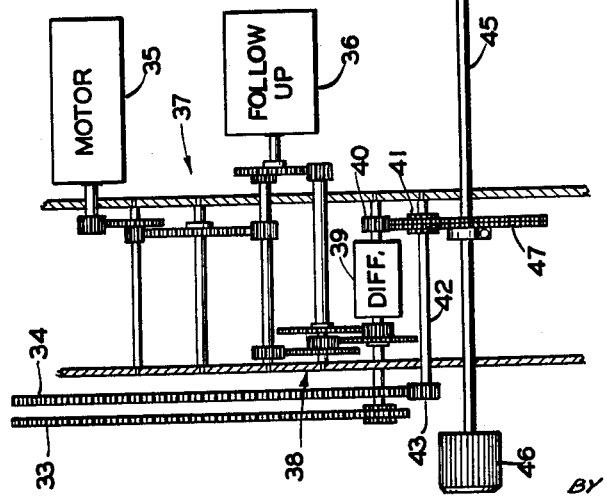
INVENTORS
MILTON BROWN
MORGAN L. DRING
BY Charles J. Worth
AGENT

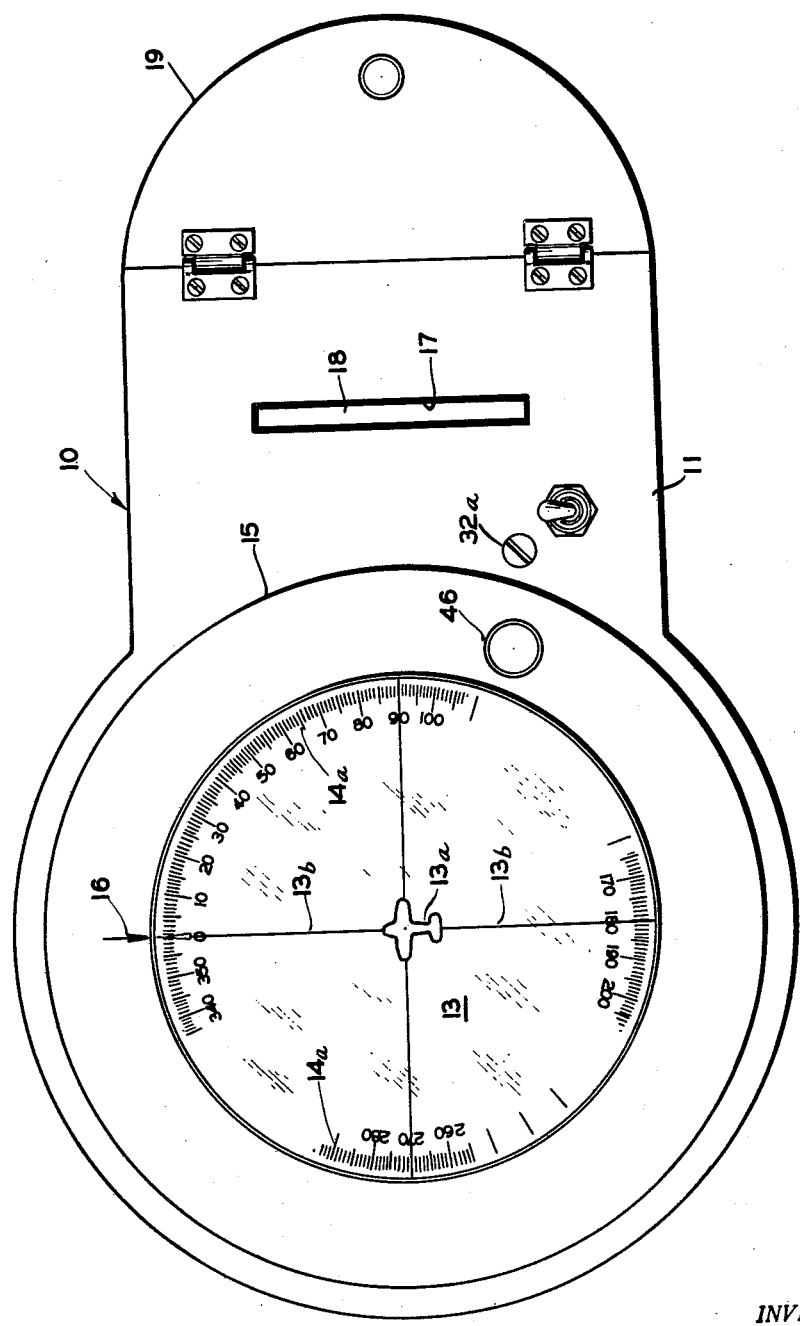

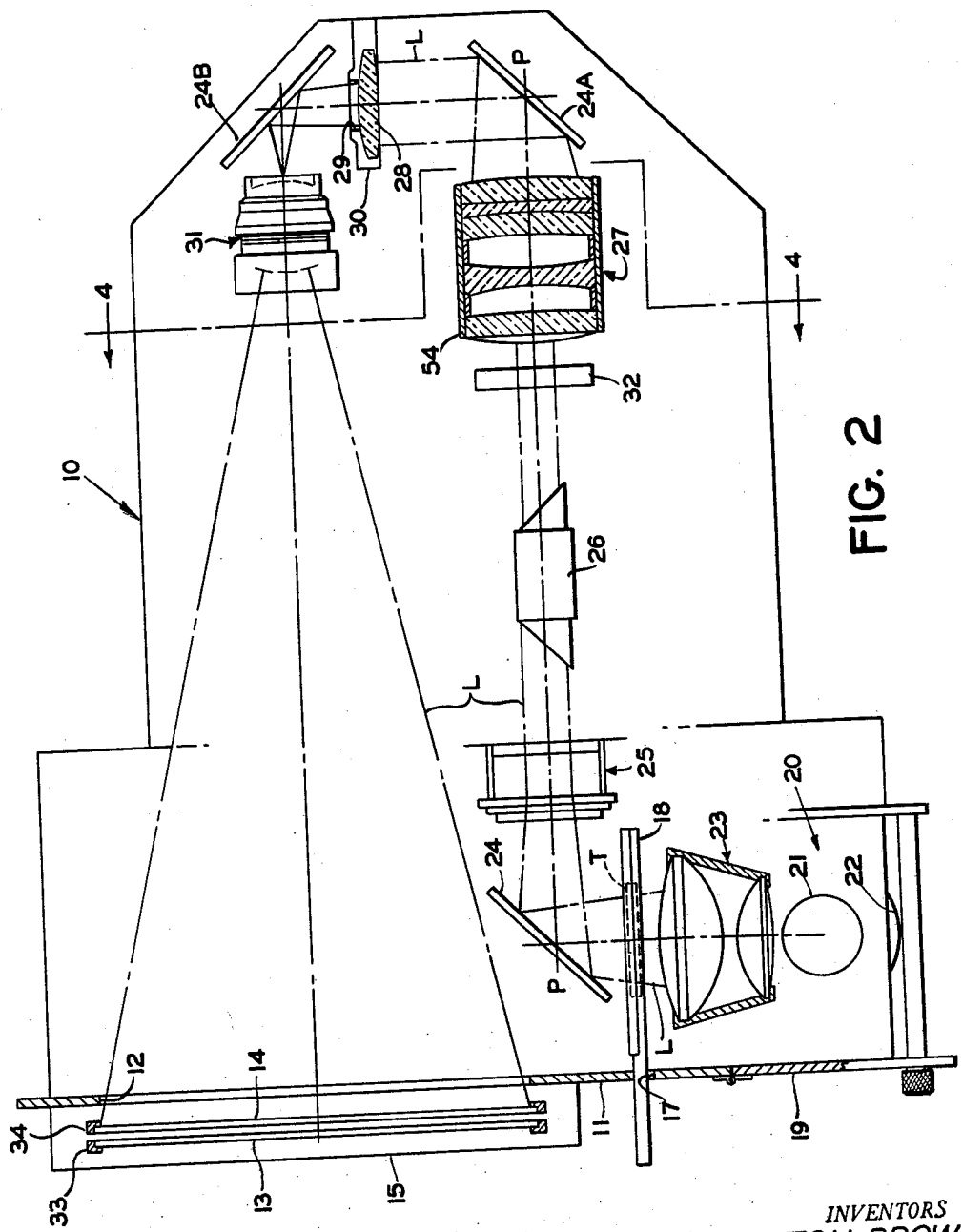

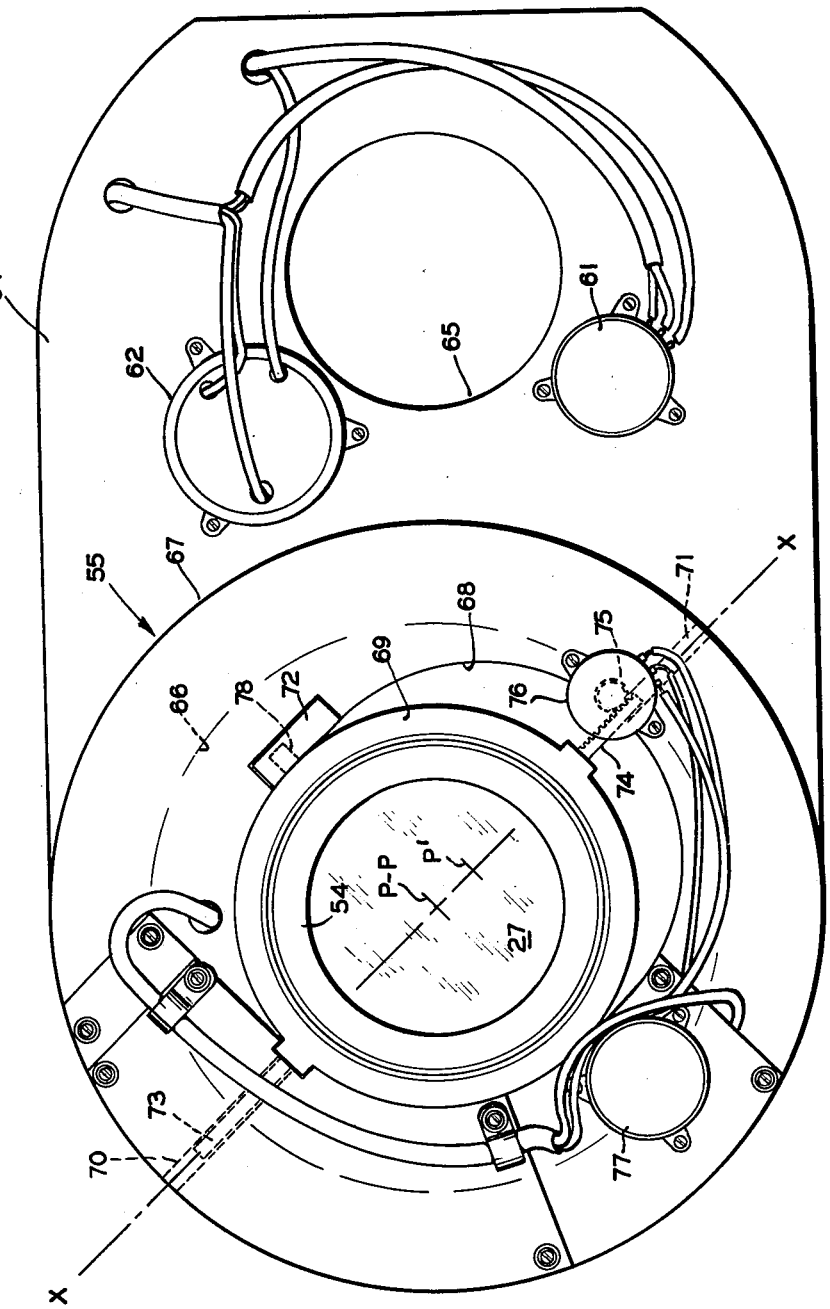

United States Patent Office 3,134,295
Patented May 26, 1964

3,134,295
PICTORIAL DISPLAY NAVIGATION EQUIPMENT
Milton Brown, Glen Rock, and Morgan L. Dring, Point Pleasant, N.J., assignors to The Bendix Corporation, a corporation of Delaware
Filed Mar. 15, 1960, Ser. No. 15,115
5 Claims. (Cl. 88—24)

This invention relates to navigation equipment for vehicles and particularly to equipment pictorially displaying navigational information.

Equipment of this type is particularly adaptable to aircraft and provides a pictorial illustration of the aircraft, its heading and the terrain it is traversing. It also provides a pictorial representation of the bearing and range of the aircraft from a station in response to bearing and range signals from the station. Results of studies indicate that pilots prefer to view an aircraft indication flying upwardly on an instrument. To maintain the direction of the aircraft indication constant as the aircraft maneuvers would require automatic rotation of the map image concurrently with changes in aircraft heading. Results of further studies have shown that when a map image rotates in this manner, orientation becomes difficult and the pilot becomes subject to vertigo. These serious effects far overshadow the desired prerequisite of maintaining aircraft indication flying upwardly on the device. There must be continuous relative displacement between the aircraft indication and the map image to provide instantaneous reference of the location of the aircraft relative to the ground. When viewing the pictorial illustration, it is desirable that the impression is given that the aircraft indication is passing over the illustration of the terrain in a normal manner.

An object of this invention is to provide a pictorial display of a vehicle and the terrain it is traversing that continuously illustrates the bearing and range of the vehicle from a signal transmitting station in response to signals therefrom.

Another object of this invention is to provide a map display of terrain having a reference station that a vehicle is traversing in which the map display moves in rectilinear coordinates in response to signals representing the relative location in polar coordinates of the vehicle to the station.

Another object of this invention is to provide a device for pictorially presenting a vehicle indication and a map image of the terrain the vehicle is traversing in which there is relative rectilinear displacement between the aircraft and ground displays in response to bearing and range signals received from a fixed transmitting station on the ground so that the relative position of the aircraft to the reference station is continuously presented by the device as the aircraft moves relative to the terrain.

Still another object of this invention is to provide the aforementioned device in which the vehicle and the map displays are manually rotatable in unison to position the vehicle indication to face upwardly on the device and to position the map illustration coincidently with the ground relative to the vehicle.

The present invention in its preferred embodiment in an aircraft, contemplates the use of the pictorial display device with air-borne equipment receiving bearing and range signals from ground transmitters in TACAN, VORTAC, DME, VOR or other similar systems. The novel display has a screen, with an aircraft indication at its center, rotatable in response to signals from a gyro compass or a similar device as the aircraft changes heading. The map image of the terrain with the reference station is projected on the screen by an optical system which receives a transparency slide as the map source. Rectilinear movement of the map illustration on the screen is accomplished by adjustment of the optical system in response to range and bearing information received from the air-borne equipment. The map image moves in a direction opposite to the indicated aircraft heading to provide the impression that the aircraft indication is passing over the illustrated terrain in a normal manner. At no time does the map image rotate in response to bearing information from the air-borne equipment. Provision is made to manually rotate the aircraft and map displays, in unison, to position the aircraft to fly upwardly on the display device and to position the map illustration to coincide with an aerial view of the terrain from the aircraft.

The foregoing and other objects and advantages of the invention will appear more fully hereinafter from a consideration of the detailed description that follows, taken with the accompanying drawings wherein one embodiment of the invention is illustrated by way of example. It is to be expressly understood, however, that the drawings are for illustration purposes only and are not to be construed as defining the limits of the invention.

FIGURE 1 is a front view of a novel device made according to the invention,

FIGURE 2 is a diagrammatic plan view of the optical system of the device of FIGURE 1, FIGURE 3 is a diagrammatic view of the drive and positioning controls for the optical system of FIGURE 2, FIGURE 4 is an enlarged detail view taken along line 4—4 of FIGURE 2 illustrating an adjustable lens arrangement in the optical system, and, FIGURE 5 is a plan view of a transparency slide with an associated receiver and automatic tuner as embodied in the device of FIGURE 1.

Referring now to the drawings and specifically to FIGURES 1 and 2, the novel pictorial display device has a case 10, and a faceplate 11 closing the front end of the case. The plate 11 has an opening 12, and a bezel 15 is fixed to the plate to rotatably mount and support a pair of lenses 13 and 14 which cover the opening 12. In the preferred embodiment, the lens 13 is translucent to act as a screen or may otherwise be capable of supporting a projected image. The lens 14 is a Fresnel or any distortion free lens. The screen 13 has an aircraft indication 13a etched at the center thereof with its longitudinal axis 13b. The lens 14 has a compass rose 14a etched at its periphery so the leading end of the longitudinal axis 13b is superimposed thereon to indicate the aircraft heading. A fixed lubber line 16 is located at the top of the bezel 15 and cooperates with the compass rose 14a to provide a bearing reading when the map image has been positioned to aline the lubber line 16, the aircraft indication 13a and a reference location on the course to be traversed. The faceplate 11 has a slot 17 which provides an entrance for a slide 18 mounting a transparency T of the map to be displayed on the screen 13. A door 19 is hinged to the end of the plate 11 to facilitate access to an illumination chamber 20 of an optical projection system when the device is mounted in a panel of an aircraft.

With specific reference now to FIGURE 2, the illumination chamber or light box 20 houses an electric lamp 21 and a light reflector 22 to provide the source of a carrier beam as as light beam L. The direct and reflected rays for the illumination chamber 20 pass through a condensing lens 23 which gathers the rays and intensifies the carrier beam L which is directed through the transparency slide 18 to a reflector or prism 24. The carrier beams L picks up the map image as it passes through the transparency T. The reflector or prism 24 changes the carrier beam path 90° and directs the carrier beam L to a collimating lens 25 on a beam projection axis P—P. The rays of the carrier beam L, after leaving the lens 23, continuously converge until they reach the collimating lens 25. The lens 25 produces parallelism of the rays of the carrier beam L which are directed along the axis P—P to a positioning lens 27 through a dove prism 26. Rotation of the dove prism 26 about its center which is coincident with the axis P—P, causes rotation of the image carried by the departing beam L. The positioning lens 27 is a composite optical structure providing an expansion of the carrier beam L as it passes therethrough. The specific arrangement of components of the lens 27 is not a feature of the invention except that they cooperate to expand the carrier beam L and project a converging beam to a condensing lens 28 by way of a reflector or prism 24A which causes another 90° change of the beam path. Displacement of the positioning lens 27 in polar coordinates to move its optical center relative to the axis P—P causes rectilinear movement of the projected map image on the screen 13 relative to the aircraft indication 13a etched on the screen 13.

The condensing lens 28 is mounted in a bracket 30 in the case 10 which has an orifice 29 to limit the amount of the carrier beam L permitted to pass therethrough. The image passing through the orifice 29 is limited to approximately half of the image obtainable from the beam L presented thereto from the composite positioning lens 27. The lens 28 may have a series of concentric circles (not shown) etched therein to provide a reticular arrangement in which the circular projections are always concentric around the aircraft indication 13a to provide a scaler indication. In contrast, a scaler indication referenced to and movable with the station indication from the transparency T may be obtained by including a reticle (not shown) or a second transparency (not shown) in the optical system before the dove prism 26. However, the circular indication may be applied directly to the transparency T of the slide 18. The carrier beam L passing through the condensing lens 28 and the orifice 29 is directed to a projection lens 31 by way of another reflector or prism 24B which causes the third 90° change of the beam path. The lens 31 projects the carrier beam L and focuses the image carried thereby on to the screen 13.

The inclusion of the reflectors or prisms 24, 24A and 24B provide a distorted carrier beam path to permit compact construction of the device. In addition, the beam path is located to place a receiver 80 (see FIGURE 5) for the transparency slide 18 and the illumination chamber 20 at the front of the device to facilitate changing map slides 18 and lamps 21. The inside of the case 10 has a dull, light-absorbing finish to prevent reflections. An iris or diaphragm 32, having a manual control 32a (see FIGURE 3), is located between the dove prism 26 and the positioning lens 27 to control the brilliance of the image projection on the screen 13.

Referring now to FIGURE 3, the screen 13 and the lens 14 are mounted in ring gears 33 and 34, respectively, which are supported by rollers (not shown) in the bezel 15. A servomotor 35, responsive to signals from a gyro compass or a similar device (not shown), is mechanically connected to its associated follow-up 36 by gears 37. The servomotor 35 is also connected to the ring gear 33 through a gear train 38 to rotate the screen 13 independently of the rest of the optical system. The ring gears 33 and 34 are interconnected for manual rotation by a differential 39 which is connected to the gear train 38 and has a gear 40 in mesh with a gear 47 which also meshes with a gear 41. The gear 41 is fixed to a shaft 42 which has a second gear 43 fixed thereto in mesh with the ring gear 34. The action of the differential 39 permits rotation of ring gear 33 and the screen 13, independent of the ring gear 34 and the lens 14, by servomotor 35. The gear 47 is fixed on a control rod 45 which extends through the bezel 15 and has a knob 46 fixed to the exposed rod end for the pilots use to manually rotate the screen 13 and the lens 14 in unison.

To provide manual rotation of the dove prism 26 and the positioning lens 27 in unison with the screen 13 and the lens 14, a second gear 48 is fixed to the control rod 45. The dove prism 26 is mounted on a bracket 49 fixed to a ring gear 50. The ring gear 50 in mesh with a gear 51 of a gear train 52 having a terminal gear 53 in mesh with the gear 48, rotates in response to rotation of the rod 45 and rotates the dove prism 26 about its center which coincides with the axis P—P. The positioning lens 27 is mounted in a lens case 54 of a lens positioning assembly 55 connected to a ring gear 56, and is rotatable therewith. The ring gear 56 is connected to the rod 45 for manual rotation through idler gears 57 and a gear train 58 which is connected to differential 59 having a gear 60 in mesh with the gear 48. A servomotor 61 responsive to bearing signals from the airborne equipment (not shown) and its associated follow-up 62 are provided for independent rotation of the lens 27. The motor 61 and the follow-up 62 are interconnected, and connected by gears 63 to the differential 59. The gear trains associated with the manual rotation control rod 45 are designed to provide the screen 13 and the lenses 14 and 27 with two rotations for each rotation of the dove prism 26. This is required because a dove prism will rotate an image carrier beam at twice the rate of its own rotation.

Referring also to FIGURE 4, a mounting plate 64 is fixed in the case 10 and supports the lens positioning assembly 55, the servomotor 61 and the associated follow-up 62. The plate 64 has an opening 65 to provide a passage for the projected image carrier beam L from the projection lens 31 to the screen 13. The plate 64 has a second opening 66 to provide a passage for the image carrier beam L from the dove prism 26 to the positioning lens 27 and to act as a track for connectors 56c (see FIGURE 3) which join the ring gear 56 to the lens positioning assembly 55. The connectors 56c joining the ring gear 56 to the assembly 55 may be any well known, low friction construction of the type capable of rotating within a circular track and maintaining a central opening within the track. The lens positioning assembly 55 has a ringlike base plate 67 with an elongated opening 68 to receive a yoke or lens holder 69. One end of the opening 68 is arcuate about a center of rotation of the plate 67 on the axis P—P and the other end is arcuate about a center P', offset from the axis P—P, along the axis X—X. The yoke 69 is circular and moves in the opening 68 between a position centered about the axis P—P and a maximum offset position about the center P'. The base plate 67 has a pair of diametrically opposite receiving passages 70 and 71 along the axis X—X. One of the elongated walls of the opening 68 has a track 72 which extends parallel to the axis X—X and the passages 70 and 71. The yoke 69 has a radially extending guide pin 73 which is slideably received in the passage 70. Diametrically opposite to the pin 73, the yoke 69 has a radially extending rack gear 74 in mesh with a gear 75 connected to the shaft of a servomotor 76. The servomotor 76 drives the yoke 69 radially relative to the axis P—P, in the opening 68, in response to range signals received from the air-borne equipment (not shown) and is mounted on the base plate as is its associated follow-up 77. The yoke 69 has a runner 78 slideable in the track 72 to prevent the yoke from swiveling on the guide pin 73 and the rack gear 74. Fixed in the yoke 69 is the lens case 54 which mounts the composite positioning lens 27 and forms a unitary structure for positioning the lens by the servomotor 76.

The screen 13 and the lens 27 are the only components of the optical system which are positioned in response to signals received by the pictorial display device. The screen 13 is rotated by the servomotor 35 in response to signals from a gyro compass (not shown) as the aircraft maneuvers. The axis 13b indicates the path on the projected map image the aircraft will traverse, and in conjunction with the compass rose 14a, indicates the aircraft heading. Rotation of the lens 27 about its optical axis has no effect on the carrier beam L. Linear displacement of the lens 27 by the servomotor 76, in response to range signals, along the axis X—X moves the map presentation linearly along a corresponding axis on the screen 13. Arcuate movement of the lens 27 by the servomotor 61, in response to bearing signals, when its optical axis is displaced from the axis P—P by the linear displacement of the lens 27 along the axis X—X causes corresponding rectilinear movement of the map projection on the screen 13 relative to the aircraft indication 13a.

In operation, referring to FIGURE 4, the servomotor 76, in response to range signals, drives the rack 74 through gear 75 to displace the lens 27 radially away from the P—P axis along the X—X axis. Simultaneously, the servomotor 61, in response to bearing signals, will rotate gear 56, referring to FIGURE 3, through a gear system hereinbefore described, to angularly displace the lens 27. The combined linear and arcuate displacements of the lens would result in a reflected rectilinear movement of the map image along a path parallel to the axis 13b, as shown in FIGURE 1, in relation to the aircraft 13a which would therefore simulate the impression of the aircraft passing over an illustrated terrain.

Manual rotation to position the aircraft indication and the map projection is accomplished by rotating the screen 13, the lenses 14 and 27 and the prism 26, in unison. Rotation of the prism 26 rotates the map image carried by the beam L and concurrent rotation of the lens 27 prevents rectilinear displacement of that image due to rotative positioning. The concurrent rotation of the screen 13 with the lens 27 and the prism 26 maintains the relative angular position of the aircraft indication 13a and its longitudinal axis 13b to the map projection. The lens 14 rotates with the screen 13 to maintain the heading indication presented by the axis 13b and the compass rose 14a.

Referring now to FIGURE 5, the transparency slide 18 is inserted into a receiver 80 through the slot 17 in the faceplate 11. The receiver 80 is formed of a front frame 81 having an abutment 82 on its inside face, and a rear frame 83. The front face of the slide 18 is provided with a shoulder 18a to cooperate with the abutment 82 and is urged into engagement therewith, when the slide is fully inserted into the receiver 80, by a pair of springs 84. The base of the receiver 80 has an end wall 85 with apertures 86, and a normally open pair of contacts 88 is mounted behind each aperture. Each map transparency T includes an indication located at its optical center of a reference station. To insure tuning to or selectively render the air-borne equipment effective to receive the controlling signals from the station indicated on the inserted transparency T, each slide 18 has a series of holes 79 to receive pins 87 which align with the apertures 86 when the slide is in the receiver 80. The contacts 88 are operatively connected to the tuner of the air-borne equipment (not shown and selectively closing the various contacts 88 or combinations thereof by the pins 87, extending through the apertures 86, automatically tunes or operatively connects the air-borne equipment to the proper station.

To permit the use of transparencies T of maps of various scales, means (not shown) are included to vary the rate of movement of the lens 27 along the axis X—X by the servomotor 76 in response to range signals from the air-borne equipment (not shown). This may be accomplished electrically by varying the value of the range signals to the servomotor 76, or mechanically by including a variable ratio gear train between the servomotor 76 and the yoke 69.

Although but a single embodiment of the invention has been illustrated and described in detail, it is to be expressly understood that the invention is not limit thereto. Various changes may also be made in the design and arrangement of the parts without departing from the spirit and the scope of the invention as the same will now be understood by those skilled in the art.

We claim:
1. A pictorial illustration device for use in a moving vehicle and adapted to receive signals transmitted by a reference station on terrain to be traversed by the vehicle and representing the bearing and range of the vehicle from said reference station, said device comprising a screen including means for indicating a vehicle thereon, a slide element in the device and held in a fixed position to provide a map image of the terrain and the station, means for directing a light beam along an axis through the map image for presenting the map image from the slide element onto said screen, a positioning lens interposed between said screen and the map image substantially along the axis of said last mentioned means, means for displacing said lens linearly in polar coordinates relative to said screen, in response to range signals, means to rotate said screen in response to the maneuvers of the moving vehicle to thereby align the vehicle indicating means with the direction of movement of the vehicle, means for arcuately displacing said lens in response to bearing signals simultaneously when said lens is displaced from the axis of the light beam, whereby corresponding rectilinear movement of the map image projected on said screen with respect to said vehicle indicating means so as to provide an indication of the position of the vehicle relative to the terrain.

2. The structure of claim 1 characterized in that said screen and said positioning lens are the only components of said device positioned in response to signals received to produce rectilinear movement of the map image on said screen.

3. A pictorial illustration device for use in a moving vehicle and adapted to receive signals transmitted by a reference station on terrain to be traversed by the vehicle and representing the bearing and range of the vehicle from said reference station, said device comprising a screen including means for indicating a vehicle thereon, a slide element in the device and held in a fixed position to provide a map image of the terrain and the station, means to project a light beam directed along an axis through the map image for presenting the map image from the slide element onto said screen, a lens positioning assembly interposed between said screen and said map image substantially in line with the axis of the light beam, said lens position assembly comprising a lens holder, a lens contained within said holder, means for displacing said holder with said lens linearly relative to said screen in response to range signals, means for simultaneously angularly displacing said holder and lens in response to bearing signals when said lens is displaced from the axis of the light beam, whereby the combination of the linear displacement and the angular displacement provide a rectilinear movement of the map image projected on said screen with respect to said vehicle indicating means so as to provide an indication of the position of the vehicle relative to the terrain.

4. The pictorial illustration device of claim 3 characterized in that said means for displacing said lens holder linearly comprises, a rack gear integral to and extending radially outwardly thereof, and a motor operable to drive said rack gear to displace said lens holder linearly in response to the range signals.

5. The structure of claim 4 further characterized in that said means for simultaneously rotating said lens when said lens is displaced linearly comprises, a ring gear integral to said lens holder and positioning said holder with said lens for angular movement, and a motor operable to drive said gear to rotate said holder with said lens angularly in response to the bearing signals.

References Cited in the file of this patent

UNITED STATES PATENTS

| | | |
|---|---|---|
| 2,085,050 | Stout | June 29, 1937 |
| 2,169,532 | Jensen | Aug. 15, 1939 |
| 2,271,296 | Hargrave et al. | June 27, 1942 |
| 2,637,848 | Cunningham | May 5, 1953 |
| 2,836,816 | Allison et al. | May 27, 1958 |